June 30, 1936.  W. RICHTER  2,045,800
ARC LENGTH INDICATOR
Filed June 8, 1934  2 Sheets-Sheet 1

INVENTOR.
Walther Richter
BY
ATTORNEY.

June 30, 1936.  W. RICHTER  2,045,800
ARC LENGTH INDICATOR
Filed June 8, 1934  2 Sheets-Sheet 2

INVENTOR.
Walther Richter
BY
ATTORNEY.

UNITED STATES PATENT OFFICE 2,045,800

ARC LENGTH INDICATOR

Walther Richter, Wauwatosa, Wis., assignor to A. O. Smith Corporation, Milwaukee, Wis., a corporation of New York Application June 8, 1934, Serial No. 729,590

7 Claims. (Cl. 177—311)

This invention provides a simple and efficient arrangement to indicate to an arc welding operator the relative arc length or voltage of a direct current welding arc, and provides an improved means of amplifying unidirectional voltages.

Referring to the attached drawings.

Figure 5:
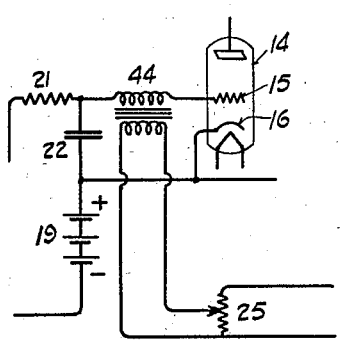
Figure 6:
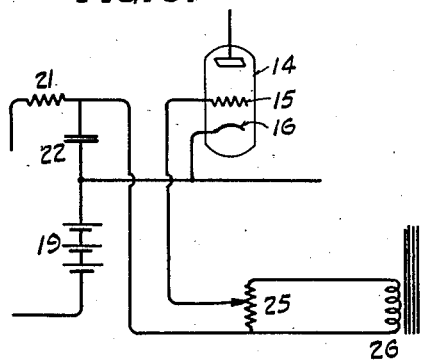
Figure 7:
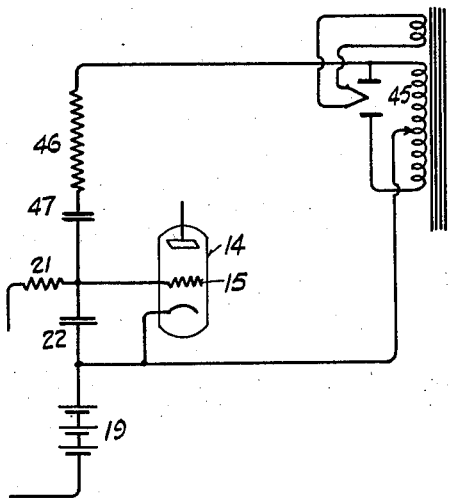

Figs. 5, 6, and 7 are diagrammatic views of a portion of the apparatus showing modifications thereof.

The arc voltage across a welding arc represents very closely the arc length conditions when other conditions of the arc, such for instance, as the character of the weldrod used, are kept constant. A welding operator usually attempts to hold an arc of a constant length, the value of which is suitable to his conditions of welding. The present invention provides the operator with a guide whereby he may be informed of even slight deviations from such desired arc length or voltage. The accuracy of the indications thus provided is maintained even though the auxiliary supply voltages to the apparatus vary.

The invention is particularly useful in conjunction with operator-controlled weldrod feeding mechanisms such as disclosed in Patent No. 1,877,969, issued to the present inventor.

Figure 1:
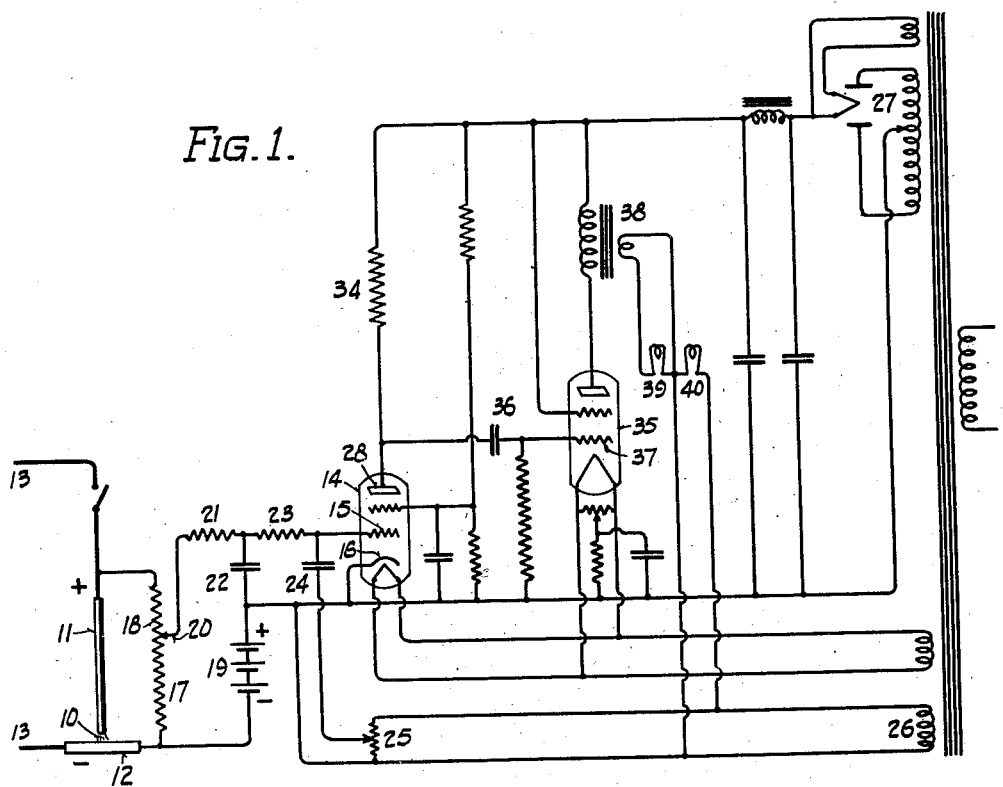
Figure 1 is a diagrammatic view of an electrical system embodying the invention.

Referring to Fig. 1, a direct current welding arc 10 is shown as maintained between the electrode 11 and the work piece 12 and receiving its supply of current from a source 13. In the present case the electrode has been shown as positive and the work piece negative.

A vacuum tube amplifier is provided to receive and amplify the desired voltage indications. The amplifier 14, shown, is a screen grid tube which is an efficient voltage amplifier. Other types of tubes will also function, for example, a three-electrode tube will serve satisfactorily in the practice of the invention.

Grid 15 of tube 14 is connected in a suitable manner through an adjustable resistance 18 and fixed resistances 21 and 23 to one side of the arc voltage, or a voltage proportional thereto, and cathode 16 of the tube is connected to the other side of such voltage. The connections to the arc voltage are preferably made, as illustrated, across an adjustable part 17 of the resistance 18 which in turn is connected in shunt to the arc. The voltage drop over resistance 17 is then proportional to the voltage of the arc and a greater range of adjustment for the apparatus is attained than is the case where the connections to the arc voltage are made directly across the arc.

It is preferred to employ the polarity arrangement here shown with the welding electrode 11 positive and the work 12 negative and a battery 19 or other suitable source of constant potential is inserted between cathode 16 and the work 12 and opposed to the voltage derived from the arc in the circuit to provide the desired grid bias range for tube 14. In this manner, if for instance, an arc voltage range from 40 to 50 is considered and the setting of connection 20 gives a voltage of from 20 to 25, a selection of a voltage for battery 19 of 26 volts will give a combined voltage range of —1 to —6.

A shunt capacity 22 is provided between resistance 21 and cathode 16 and the resistance 21 and capacity 22 are so proportioned that an appreciable time constant is introduced in the transmittal of voltage changes, occurring at the arc, to the grid 15. It is preferred to make this time constant of the order of one to two seconds, thus insuring that none of the rapid changes of voltage inherent in the operation of a welding arc shall appear at the grid. By this means the voltage which is impressed upon the grid by the arc is a smooth average value of the voltages derived from said arc.

The above described modes of connecting the arc voltage to the vacuum tube through a voltage divider resistance 18, an opposed fixed voltage, and a voltage averaging arrangement are described in copending application, Serial No. 728,886, filed by the present inventor.

In the present invention a known alternating current voltage variation is impressed between the cathode and grid of the amplifying tube. This is accomplished in Fig. 1, by means of an alternating voltage drop produced in resistance 23. To produce said voltage drop through resistance 23, a connection is made through condensers 24 and 22 connected on opposite sides of resistance 23 and to a voltage dividing resistance 25 which in turn is connected to a source of alternating voltage consisting of transformer coil 26.

Amplifying tube 14 is supplied with plate circuit voltage by means of a standard rectifier unit 27. The effect upon the resulting plate current flowing between plate 28 and cathode 16 of tube 14, due to variations of the voltage applied between grid 15 and cathode 16, is illustrated by the diagram in Fig. 2.

Figure 2:
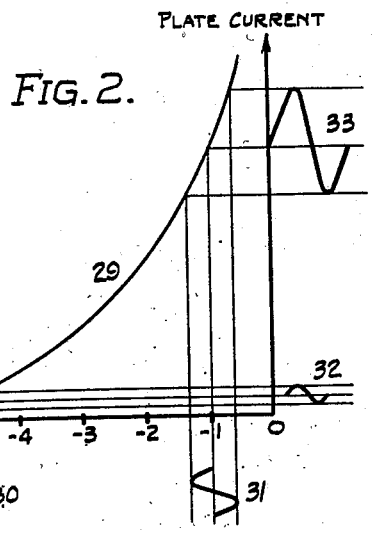
Fig. 2 shows a characteristic curve for a vacuum tube such as illustrated in Fig. 1.

Referring to Fig. 2, curve 29 represents the plate current-grid voltage characteristic of an amplifier tube. The grid voltages are plotted horizontally, and here cover an indicated range of zero to —5 volts; and the plate current is plotted vertically without the assignment of definite values. The purpose of Fig. 2 is to illustrate the effect upon the plate current of introducing in the grid circuit an alternating voltage of known value such as previously described as produced at resistance 23 of Fig. 1.

Curves 30 and 31 represent such an alternating voltage of approximately one-quarter volt in value introduced upon the grid when the average voltage of the grid is —5 in the case of 30 and —1 in the case of 31. By examining the relationships disclosed in Fig. 2 it will be evident that introduction of the one-quarter volt variation at 30, where the average voltage is —5, will produce a relatively small plate current alternating value as shown at 32, whereas the same voltage variation introduced at 31, where the average voltage value is —1, produces a large alternating component of the plate current as shown at 33. An alternating component of the plate current is thus produced, the magnitude of which is dependent upon the average voltage applied to the grid. This average voltage is in turn a function of the voltage at the welding arc.

Referring to Fig. 1, the voltage drop produced by means of resistance 34 and the plate current of tube 14 passing therethrough has its alternating component applied by a standard amplifying arrangement to a second tube 35. Condenser 36 insures that only the said alternating component of the voltage variation is applied to the grid 37 of tube 35. Transformer 38 transmits an amplified alternating component of the plate current produced in power tube 35. The value of the alternating current transmitted by transformer 38 is a function of the voltage across the arc and in the arrangement shown in Fig. 1 increases as the voltage across the welding arc becomes greater and decreases as said voltage becomes less.

The current from transformer 38 passes through lamp 39 which serves as the indicator to the operator of the condition of the arc length. Lamp 40 is a standard with which the operator continually compares the brilliancy of lamp 39. Lamp 40 is here connected across transformer coil 26 which is also the source of the alternating voltage superimposed upon the average, arc derived, unidirectional voltage at the grid of the voltage amplifying tube 14. Any small variation of the brilliancy of lamp 40 due to variations in the voltage of source 26 is accompanied by a corresponding change in the brilliancy of lamp 39 since the same proportional change occurs in the alternating voltage component applied to grid 15. It is apparent then that the accuracy of comparison of the existing arc length, represented by lamp 39, with a desired arc length, represented by the lamp 40, is unimpaired by normal variations of the voltage of the alternating current source.

It is also true that the accuracy of such comparison does not depend upon the constancy of the characteristic of the voltage amplifier tube. For instance, suppose the total plate current in the tube 14 were to be increased, due to a rise in the plate voltage or due to a heating up of the cathode, the result would be only a general rise of the characteristic curve 29 of Fig. 2. The slopes of this curve would remain substantially the same for the same grid voltage and hence the alternating voltage component impressed upon the grid at any given arc voltage would produce the same amplitude of alternating component of the plate current. By the arrangement here provided a true indication of arc lengths is assured and is not affected in general by variations other than those of the average arc voltage itself.

Figure 3:
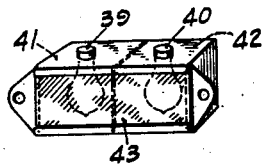
Fig. 3 is a perspective view of a mode of mounting the comparison lamps of Fig. 1.

Fig. 3 is a perspective view of a mounting employed for the lamps utilized to provide a comparison of arc lengths or voltages. Lamps 39 and 40 are mounted in cells 41 and 42, respectively, conveniently arranged beside each other for observation by the operator. A ground glass or similar plate 43 is placed over the openings in the cells.

Figure 4:
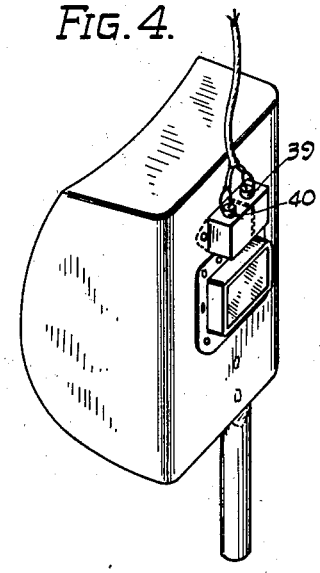
Fig. 4 is a perspective view of a welding operator's shield showing a mode of mounting the lamps of Fig. 3 therein.

Fig. 4 illustrates a convenient manner of mounting the comparison lamps in the hood of an operator so that the two illuminated portions of plate 43 are exposed to the interior of the shield and in range of the operator's vision while he is watching the welding arc through the shield.

Figs. 5, 6, and 7 illustrate additional ways of superimposing at the grid 15 an alternating voltage of fixed value upon the unidirectional average voltage value derived from the arc. In Fig. 5, resistance 23 and condenser 24 of Fig. 1 are omitted from the circuit and transformer 44 interposed having its secondary placed in the position occupied by resistance 23 of Fig. 1.

Fig. 6 is similar to that of Fig. 5 except that instead of putting transformer 44 of Fig. 5 in the place of resistance 23 of Fig. 1 the source 25 of alternating voltage is connected in series between resistance 21 and grid 15.

In Fig. 7 a way is shown of deriving the superimposed alternating voltage from the standard rectifier employed to supply plate voltage to the tubes. After condenser 22 of Fig. 1 has been determined a computation is made to determine the magnitude of alternating current which when passed through this condenser will impress thereon the desired magnitude of alternating voltage. This current is then passed through condenser 22 by connecting it across coil 45 of the rectifier through resistance 46 and condenser 47 which are so determined as to supply the required amount of current by means of the voltage existing across coil 45.

It has been found that an average voltage variation of as little as one-tenth volt at the arc will cause a noticeable change in brilliancy of light 39. This insures an extremely sensitive indicator for use in controlling of arc voltages or lengths.

While I employ one mode of varying the amplification of a fixed alternating voltage by means of a unidirectional voltage for the purpose of indicating the value of the latter, other known amplifying systems may also be adapted to produce such an alternating current measure for unidirectional voltages.

One skilled in the art may modify the above embodiments without departing from the spirit of the invention herein disclosed and claimed.

I claim:

1. An indicating means for unidirectional voltages comprising means for producing an alternating voltage of predetermined value, means to produce alternating current values in response to said predetermined value but modified in accordance with variations in said unidirectional voltages to constitute a measure for said unidirectional voltages and means responsive to said alternating current values to indicate the values of said unidirectional voltages.

2. An indicating means for unidirectional voltages comprising means for producing an alternating voltage of predetermined value, means to amplify said alternating voltage, means to vary the amplification produced by said last-mentioned means in accordance with variations in the unidirectional voltage, and means responsive to said amplified alternating voltage to indicate the value of the unidirectional voltage.

3. An indicating means for unidirectional voltages comprising means for producing an alternating voltage of predetermined value, means to produce alternating current values in response to said predetermined value but modified in accordance with variations in said unidirectional voltages to constitute a measure for said unidirectional voltages, and means including light means responsive to said modified alternating values to indicate the values of said unidirectional voltages.

4. A direct current arc length indicator comprising a vacuum tube of at least three electrodes, means for impressing across two of such electrodes an alternating voltage of predetermined value, to produce amplified alternating values of said alternating voltage in the output of said tube, means to vary said amplified alternating values in accordance with the variations in the average voltage of said arc, and means responsive to said amplified alternating values to indicate the length of said arc.

5. A direct current arc length indicator comprising an electronic vacuum tube of at least three electrodes, connections whereby an alternating voltage of predetermined value is impressed upon said tube through two of said electrodes to amplify said alternating voltage and produce thereby an alternating component in the output of said tube, additional amplifying means to amplify said alternating component, means to effect a variation in the values of said amplified alternating component in accordance with the variations of the average voltage of said arc, and means responsive to said amplified alternating values to indicate the length of said arc.

6. A direct current arc length indicator comprising a vacuum tube of at least three electrodes, means for impressing across two of such electrodes an alternating voltage of predetermined value, to produce amplified alternating values of said alternating voltage in the output of said tube, means to vary said amplified alternating values in accordance with the variations in the average voltage of said arc, light means responsive to said amplified alternating values to indicate the length of said arm, and a standard comparison light means located with respect to said arc length indicating means for comparison therewith.

7. A unidirectional voltage indicator comprising a vacuum tube having at least an anode, a cathode, and a grid, means for impressing across the grid and cathode an alternating voltage of predetermined value, means for supplying a unidirectional biasing voltage to the grid, which biasing voltage is a function of the unidirectional voltage to be indicated, whereby the gain of the tube is varied in accordance thereto, and means responsive to the alternating voltage component of the output of the tube for indicating the value of the unidirectional voltage.

WALTHER RICHTER.